March 3, 1953
W. J. DEGNEN ET AL
2,630,352
MEANS FOR HANDLING POWDERED SOLIDS
Filed Jan. 29, 1947
4 Sheets-Sheet 1
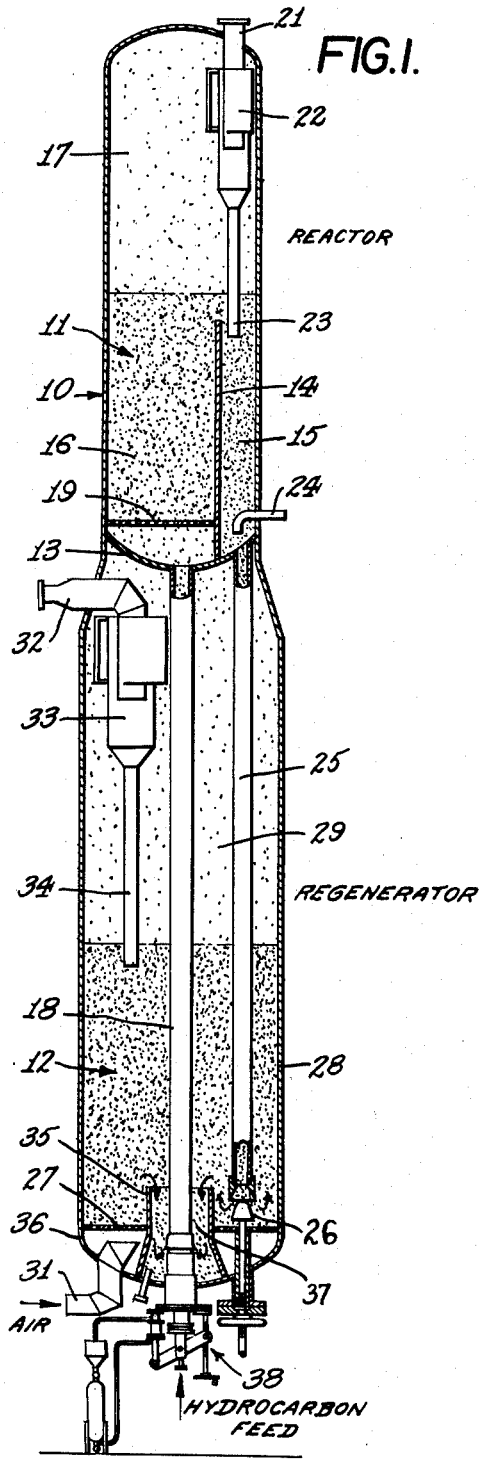
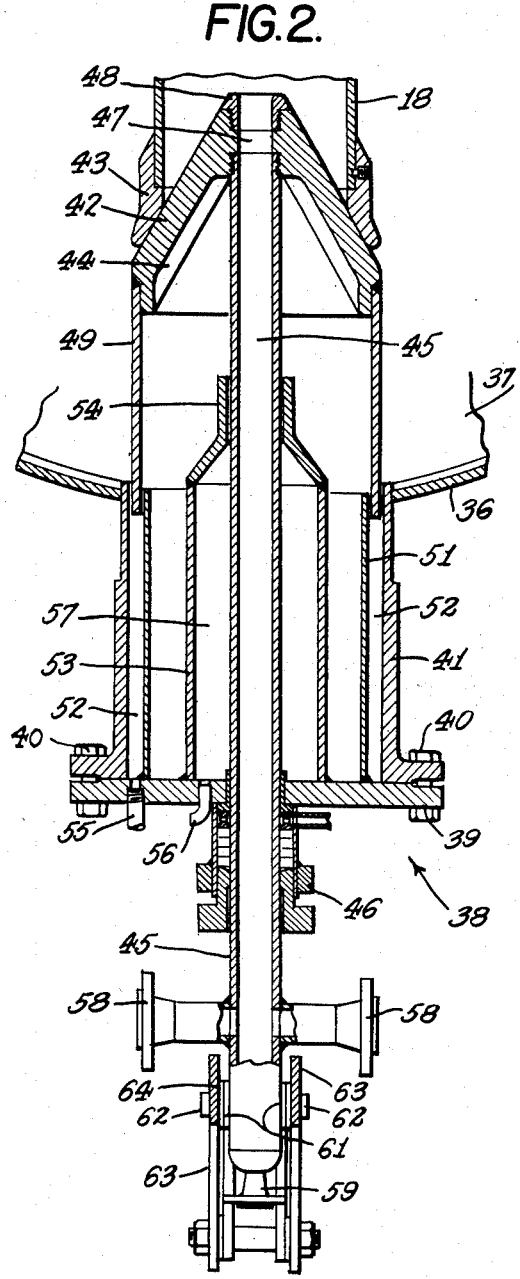
INVENTORS.
WILLIAM J. DEGNEN
W. BENEDICT JOHNSON
BY E. F. Liebrecht
William Klabunde
ATTORNEYS March 3, 1953 W. J. DEGNEN ET AL 2,630,352

MEANS FOR HANDLING POWDERED SOLIDS

Filed Jan. 29, 1947 4 Sheets-Sheet 2

INVENTORS.
WILLIAM J. DEGNEN
W. BENEDICT JOHNSON
BY
E. F. Liebrecht
William Klabunde
ATTORNEYS

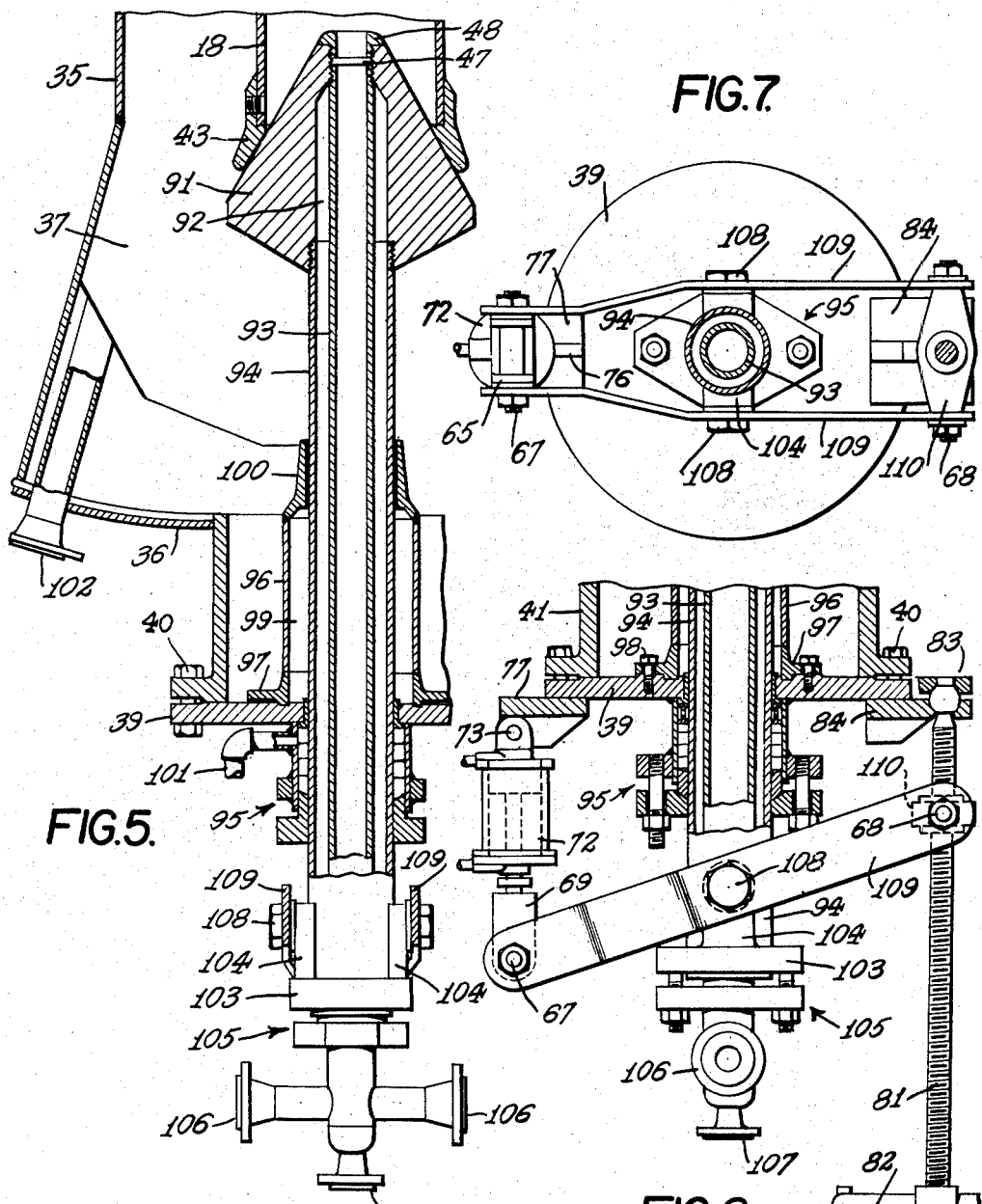

March 3, 1953 W. J. DEGNEN ET AL 2,630,352
MEANS FOR HANDLING POWDERED SOLIDS
Filed Jan. 29, 1947 4 Sheets-Sheet 4
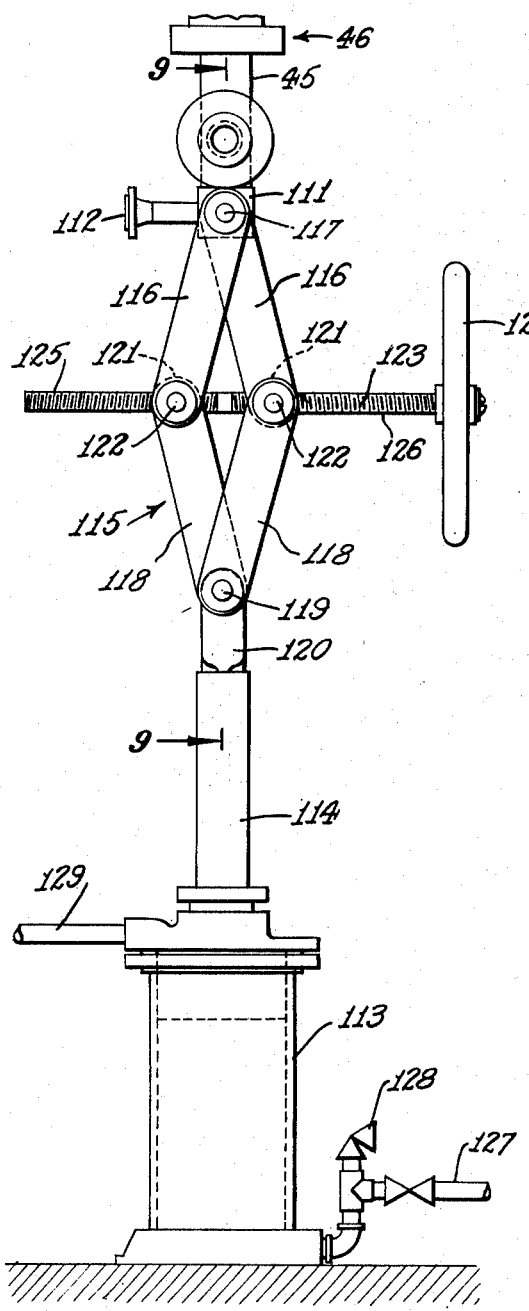
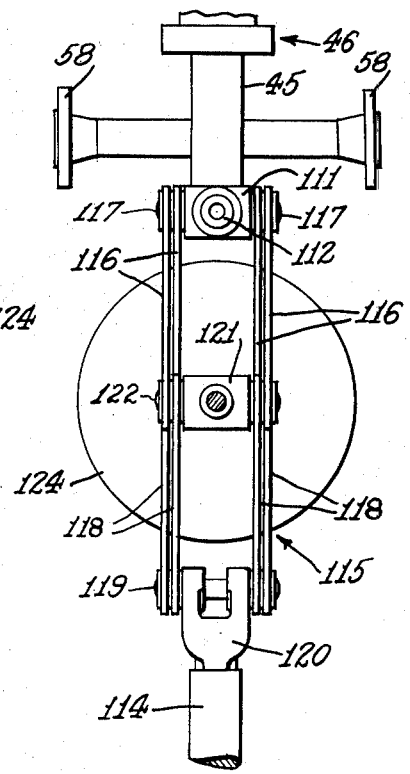
INVENTORS.
WILLIAM J. DEGNEN
W. BENEDICT JOHNSON
BY E. J. Liebrecht
William Klabunde
ATTORNEYS Patented Mar. 3, 1953

2,630,352

UNITED STATES PATENT OFFICE 2,630,352

MEANS FOR HANDLING POWDERED SOLIDS

William J. Degnen, Westfield, and William Benedict Johnson, Far Hills, N. J., assignors to The M. W. Kellogg Company, Jersey City, N. J., a corporation of Delaware Application January 29, 1947, Serial No. 724,956

7 Claims. (Cl. 302—52)

This invention relates in general to a means for handling finely divided solids, and particularly to a means for transferring finely divided solid material in fluidized condition from a chamber through a carrier line in communication therewith.

More particularly, the invention is concerned with an improved injector means whereby a carrier fluid stream from an external source may be passed through the wall of a chamber containing a fluidized bed of finely divided solid material and injected in an axial direction into the lower end of an upwardly extending carrier line in open communication with said fluidized bed for conveyance with the stream of fluidized material passing from the fluidized bed through the carrier line by reason of the pressure differential existing between the chamber and the carrier line.

While the injector valve constructed in accordance with this invention is adaptable for the transfer of finely divided or powdered materials, whether in fluidized or non-fluidized condition, it is especially applicable to the transfer of such materials in a fluidized state, as for example, powdered catalyst transfer in a fluid catalyst cracking system in the petroleum refining art. More specifically, injector valves of the type herein disclosed may be used to advantage for effecting the transfer of regenerated catalyst from the dense bed of the regenerator of a fluid catalyst cracking system directly to the reactor through a carrier line in communication with the dense bed. The carrier fluid in such application may be the hydrocarbon feed stream. Similarly, the valve may be employed for transferring spent catalyst to the regenerator, in which case the carrier fluid would preferably be an air stream.

It is the present practice in fluid catalyst cracking systems to pass the fluidized catalyst from one vessel to another, or from one chamber to another, by means of a static pressure head established in a vertical standpipe in open communication with the vessel at the bottom of the dense bed of fluidized catalyst. The standpipe through which the catalyst is withdrawn is of sufficient length so that the static pressure at its base is sufficient to pass the powdered catalyst withdrawn from the first vessel or chamber upwardly through a carrier line communicating with the lower end of the standpipe into the second vessel or contact chamber. In the carrier line the fluid catalyst stream receives an injection of carrier fluid, such as air or hydrocarbon vapors, which serves to create a less dense suspension of the catalyst particles within the carrier line. In the case of catalyst being withdrawn from the regenerator for passage to the reactor, the catalyst stream entering the carrier line is contacted with a preheated hydrocarbon stream. The latter, if liquid, is immediately flash vaporized by contact with the hot regenerated catalyst particles and forms within the carrier line a less dense stream comprising a mixture of catalyst and hydrocarbon vapors.

It has been found that by incorporating the reactor and the regenerator of a fluid catalyst system within a single vessel as separate zones or chambers superimposed one above the other, material savings in labor and equipment may be effected.

A principal advantage in superimposing the reactor immediately above the regenerator, or vice versa, is that it permits the use of straight lines of communication between the contact zones for circulating the fluidized catalytic material back and forth between the zones. The consequent elimination by such arrangement of all bends or turns in the transfer lines between the zones effects a material reduction of wear within the transfer lines caused by the erosive action of the catalyst particles. Since erosion is most serious at the points of sharp curvature in the fluid passage, or at points where the direction of flow is abruptly changed, and at points where the non-axial injection of a fluid carrier or aeration stream into the catalyst carrier line may cause impingement of the catalyst particles against the carrier line wall opposite the point of injection, it is especially desirable to have the catalyst particles entering the transfer line and the fluid stream injected therein travel in a direction parallel to the axis of the carrier line.

It is a principal object of this invention, therefore, to provide a simple, effective means for transferring or discharging fluidized powdered material from a dense fluidized bed within a chamber through a carrier line extending outwardly of the chamber from a point within the dense fluidized bed by the injection of fluid into the carrier line.

Another object is to provide an injector valve for the end of a carrier line extending into a dense bed of fluidized powder within a chamber adapted to simultaneously control the flow of powdered material from the dense powder bed into the carrier line and provide a fluid passage in open communication with the carrier line from a point outside the chamber through which a fluid stream may be passed effective to cause a flow of the powdered material from the zone immediately adjacent the valve, when in its open position, into the carrier line for conveyance through the latter.

A further object is to provide an externally controllable hollow stem injector valve extending within a chamber having a closure member adapted to control the flow of fluidized powdered material within the chamber into the end of a carrier line extending therein while continuously providing open communication for a fluid stream from a point outside the chamber to a point within the carrier line.

These and other objects are effected by our invention as will be apparent from the following description and claims taken in connection with the accompanying drawings forming a part of this application, in which:

Fig. 1 is a partial section view in elevation showing the injector valve and the external control apparatus associated therewith applied to the lower end of a vertical carrier line connecting superimposed reaction and regeneration chambers within a single vessel;

Fig. 2 is an enlarged sectional view of the injector valve shown in Fig. 1;

Fig. 5 is an enlarged sectional view showing a modification of the valve of Fig. 1;

Fig. 6 is a side view of the valve control mechanism of Fig. 5;

Fig. 7 is a bottom view of Fig. 6;

Fig. 8 is a modification of the external control apparatus for operating the valve; and Fig. 9 is a side view of Fig. 8.

Figure 4:
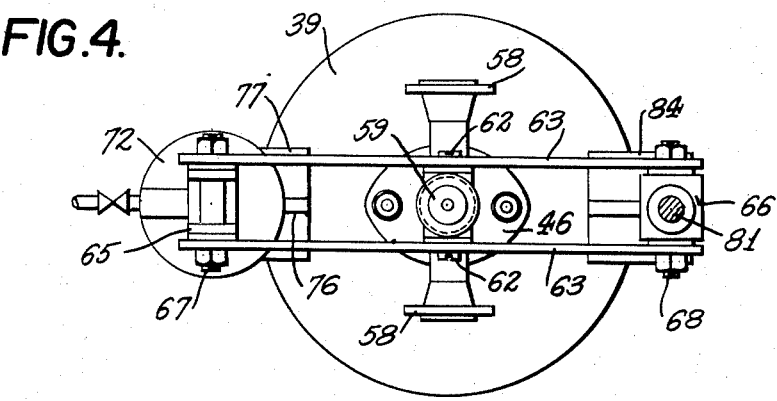
Fig. 4 is a bottom view of Fig. 3.

Referring now to the drawings, the numeral 10 designates a tower or vessel comprising a reaction zone 11 superimposed upon a regeneration zone 12, the zones being separated by the partition 13. The reaction zone 11 is provided with a vertical partition 14 which forms with the vessel wall a stripping well 15 at one side of the reactor. The catalyst powder within the reactor is maintained in a fluidized condition in phase separation, providing a dense phase 16 and a dispersed phase 17. The powdered catalyst is passed simultaneously with the hydrocarbon vapors into the reaction zone at the bottom through a vertical carrier line 18, in a manner to be hereinafter more fully described. The catalyst and the hydrocarbon vapors in intimate admixture pass upwardly through a horizontal grid 19 extending across the bottom of the reaction zone.

The products of reaction, together with entrained catalyst fines, are discharged from the reaction zone through an outlet 21 at the top of the reactor. Separating means, such as a cyclone separator 22, is provided within the dispersed phase 17 adjacent the outlet 21 to separate the entrained catalyst from the discharging hydrocarbon effluent and to deposit the recovered material in the stripping well 15 by means of standpipe 23. The level of the interface or zone of separation between the dense phase and the dispersed phase of the fluidized catalyst mass is maintained above the upper horizontal edge of partition member 14, so that catalyst from the dense phase may continuously pass over the edge of the partition and be deposited in the well 15.

An inlet nozzle 24 is provided at the base of the well 15, connectable with a source not shown, for injecting steam or any other suitable stripping medium into the descending column of fluidized catalyst within the stripping zone. The stripping medium and the stripped hydrocarbon vapors pass upwardly from the stripping zone 15 into the dispersed phase 17 of the reaction zone and are discharged with the reaction products through outlet 21 and passed to a conventional recovery or fractionating system, not shown.

At the base of well 15 a straight vertical standpipe 25 is provided to convey the powdered catalyst stream from the stripping zone downwardly to a point adjacent the bottom of the regeneration zone 12. A valve 26, which may be either of the conventional plug type or the injector type, hereinafter to be described, regulates the flow of catalyst from the base of the standpipe 25 into the regeneration zone. The injector type valve of the present invention may be used to advantage in supplying aerating gas to prevent plugging of the standpipe during valve shut-off periods. In the regeneration zone 12 the catalyst is maintained in phase separation above a grid member 27 extending across the bottom of the regenerator. The catalyst is divided into a dense phase 28 and a dispersed phase 29. Regenerating fluid, such as air or oxygen, is continuously introduced into the regeneration zone 12 in the space below the grid 27 through conduit 31, from which space it is uniformly distributed to the dense bed of catalyst through the grid. The combustion products formed by the regeneration of the spent catalyst pass upwardly through the dispersed phase 29 and are discharged through outlet 32 in the top of the regenerator. Separating means, such as a cyclone separator 33 is placed within the dispersed phase to separate the entrained catalyst from the regeneration vapors or gases. The recovered catalyst is returned to the dense phase bed of the regenerator zone through standpipe 34, while the gaseous products of regeneration are discharged through the outlet 32.

A short upright tubular member 35 is attached along its lower edge to the bottom end closure 36 of the reactor, extending from the inner wall upwardly in axial alignment with carrier line 18 to a point above the grid 27, and preferably to a point above the lower end of standpipe 25. The lower end of carrier line 18 extends a substantial distance into the well 37 formed by the member 35. A retractable injector valve, generally indicated by the numeral 38, forms a closure for the end of carrier line 18 to control the flow of catalyst from the well 37 into the line. The valve 38 has a hollow stem in open communication through the closure member with the carrier line, and connectable externally of the vessel 10 with a hydrocarbon source, as indicated by the arrow.

Figure 3:
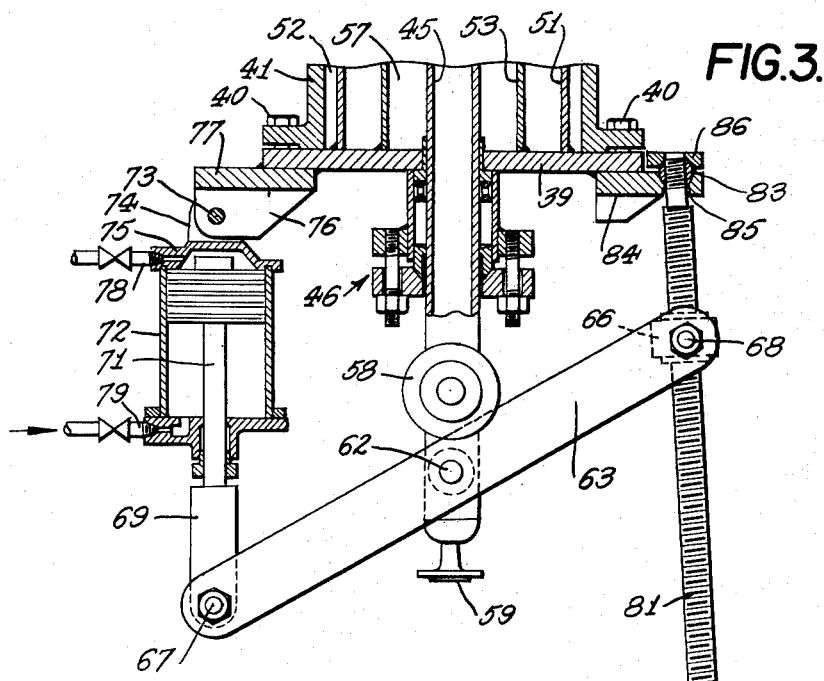
Fig. 3 is a sectional side view of Fig. 2.

For a clearer understanding of the valve construction, reference is made to Figs. 2, 3 and 4, wherein the injector valve 38 is shown supported on a cover plate 39 attached as by bolts 40 to a flanged connector 41 attached to the bottom closure 36 of the regenerator concentrically with respect to the carrier line 18, so as to provide a means of access to the well 37 through which the entire injector valve may be removed as a unit with the cover plate 39 for the purposes of inspection, repair, or replacement.

The valve comprises a plug-type head 42 of substantially conical shape adapted to seat against a complementary tapered collar 43 removably attached to the lower end of carrier line 18. Head 42 is concave on the underside and is provided with a series of inner ribs 44 for the purpose of strengthening the conical wall. Head 42 is supported on a hollow valve-stem 45 which extends downwardly through cover plate 39. A packed joint 46, of conventional type, is provided between the hollow valve-stem and the cover plate which, though fluid-tight, permits longitudinal movement of the valve-stem through the cover plate to move the valve head 42 toward or away from its seat 43.

Valve-stem 45 is threaded into the underside end of an opening 47 extending axially through the head 42. A removable hollow tip 48 is threaded into the opposite end of the opening 47 at the apex of the head. The tip 48 may be formed of material especially resistant to erosion and may be shaped to provide the flow characteristics desired in the injected fluid stream.

Depending from the lower or base end of the conical head 42 is a cylindrical skirt 49 arranged to slide telescopically within the connector 41. Only sufficient clearance is maintained between the skirt and the wall of the connector to permit free movement of the skirt through the connector, as required when the valve is being removed as a unit with the cover plate 39. Close spacing between the skirt and the connector wall is desirable in order to minimize the leakage of powdered catalyst from the well 37 into the connector.

A cylindrical member 51, integrally attached at one end to cover plate 39, is disposed concentrically within the connector 41, extending the length thereof and telescopically engaging the skirt 49 so that the latter slides within a narrow annular channel 52 formed between the inner wall of the connector 41 and the outer wall of the cylindrical member 51.

A valve-guide sleeve 53 having a cylindrical body portion of substantially greater diameter than the diameter of the valve stem but of lesser diameter than the diameter of member 51 is arranged concentrically with respect to the valve stem 45 with its lower end integrally attached to the cover plate 39. The upper end of sleeve 53 has a constricted portion which engages the hollow valve stem 45 in a sliding fit to form a valve guide 54. The telescopic sealing arrangement provided by the members 41, 49 and 51 provides a substantially catalyst-free atmosphere for the valve guide 54, so that erosion of the valve stem by reason of the infiltration of catalyst particles into the narrow space between the valve stem 45 and the valve guide 54 is effectively minimized.

To further insure against the leakage of catalyst into the inner structure of the valve, aeration inlets 55 and 56, connected to a source not shown, are provided respectively for the annular space 52 and the annular space 57 between the valve guide sleeve 53 and the valve stem 45. By reason of the small cross-section flow area provided by the narrow spacing between the telescoping members, the aerating gas provides an effective velocity seal against the infiltration of catalyst particles within the connector 41.

The outer end of hollow valve stem 45 is provided at either side with flanged connecters 58, connectable, as by means of flexible conduits, to a source of hydrocarbon oil or vapors, not shown. An end connecter 59 is also provided through which fluid for other purposes may be introduced, and through which the valve-stem may be drained.

Between connecters 58 and the end of the valve-stem, diametrically opposite bosses 61 are formed on the outer surface of the valve-stem. Pivot pins 62 extend outwardly from the bosses on a diameter of the valve-stem. A pair of flat elongated link members 63 are pivotally mounted substantially midway between their ends on the pivot pins 62, being spaced from the bosses by washers 64.

The link members 63 are arranged in parallel and are connected at their ends by yoke members 65 and 66 pivotally attached to the link members at 67 and 68, respectively.

Yoke member 65 is attached, as by connecter 69 to the end of piston rod 71 of a hydraulic cylinder 72, of conventional design. The hydraulic cylinder is pivotally suspended at 73 by means of a lug 74 formed on the back end cover 75 of the cylinder. Pivot 73 is horizontally mounted in the depending web portion 76 of a bracket 77 attached to the outer face of cover plate 39, so that the hydraulic cylinder may rotate about the pivot 73 in a plane through the axis of valve-stem 45. Outlets 78 and 79 are provided at the ends of the hydraulic cylinder 72 for connection to a source of fluid, as shown in Fig. 1.

The pivoted yoke member 66 connecting the opposite ends of link members 63 has a threaded opening for the reception of a feed-screw 81 having a hand-crank 82 at its free end. The opposite end of feed-screw 81 is provided with a ball member 83 by which it is connected in a ball-and-socket arrangement to a bracket 84 connected to the outer face of cover plate 39. The end of feed-screw 81 projects through a tapered opening 85 in the bracket 84. A plate member 86, attached to the bracket 84 as by screws, not shown, retains the ball member 83 in complementary socket portions provided in the opposed faces of the bracket 84 and the plate member 86. Feed-screw 81 is thus mounted for free rotation in the ball-and-socket joint, and it may be angularly displaced about the joint as a pivot, a limited amount in any direction, dependent upon the size and taper of opening 85.

Through the linkage arrangement above described, the valve stem 45 may be moved longitudinally to open or close the valve. Clockwise rotation of the hand-crank 82 causes the yoke member 66 to travel along the feed-screw toward the crank. This movement causes link members 63 to rotate about the pivot 67, which tends to remain in fixed position by reason of the piston within hydraulic cylinder 72 being normally maintained by the fluid pressure therein in its back position, that is, with the piston rod 71 fully retracted. Since the path of movement of the valve stem 45 is fixed, changes in the angular position of links 63 with respect to the valve stem cause angular displacement of the feed-screw 81 about the ball-and-socket joint, and of the hydraulic cylinder 72 about pivot 73.

The hydraulic cylinder is provided in one member of the linkage system as a safety measure to guard against expansion in the carrier line when the valve is in closed or nearly closed position and the temperature of the unit is raised to a high level. Expansion of the carrier line exerts a downward force on the valve stem which is translated to the link members 63 through the pivot 62. The hydraulic cylinder 72 is set to resist a desired maximum pull on the piston rod 71. Forces in excess of this predetermined maximum cause the piston to move outwardly, thus relieving the strain on the valve mechanism and the carrier line.

It is contemplated that when operating conditions are such as to preclude the possibility of excessive expansion, or where extensive expansion may take place but provision is made for relieving the strain on the carrier line and the valve stem in a different manner, hydraulic cylinder 72 may be eliminated and a rigid, non-expansive link member substituted.

A modification of the valve 38 is shown in Figs. 5, 6 and 7. The external control mechanism is substantially identical with the control mechanism shown in Figs. 2, 3 and 4, with the exception of the link members pivotally attached to the valve stem.

Valve head 91 is shaped at its forward end identically with valve head 42 of Fig. 2, being provided with an opening 47 to receive removable hollow tip 48. The under or back side of valve head 91, instead of being concave or cup-shaped, is provided with an axial tubular passage 92 connecting with the inner end of opening 47 and having a diameter substantially greater than that of opening 47.

A hollow valve-stem 93 extends through the passage 92 and is threaded at its upper end into the inner end of the opening 47. A second tubular member 94 encircles the valve-stem 93 to form a concentric, spaced jacket, and is threaded at its upper end into the end of passage 92. The inner diameter of tubular member 94 is equal to the diameter of passage 92 so that a continuous annular space is provided about the valve-stem 93 for the greater portion of its length.

Both the valve stem 93 and the jacket 94 extend through the cover plate 39, a packed joint 95 of conventional design being provided between the jacket and the cover plate through which the jacket may move freely in a longitudinal path.

A valve guide sleeve 96, having a flange 97 at its lower end, is attached to the inside of the cover plate 39, as by screws 98, shown in Fig. 6, and surrounds the tubular jacket member 94 for a portion of its length to provide an annular space 99 about the jacket member 94. A constricted portion 100 is provided at the upper end of valve-guide sleeve 96 to form a guide for the jacketed valve-stem. Packed gland 95 is provided with a conventional aeration inlet 101 connected to a source of aeration fluid such as steam or air, not shown. The aerating fluid introduced through inlet 101 discharges into the annular space 99 and passes upwardly through the narrow space between the member 94 and the constricted portion 100 of guide sleeve 96 to keep the space free of catalyst particles, which if deposited between the members 94 and 100 or between the member 94 and the gland 95 would cause excessive wear.

The supply of aerating medium introduced through connection 101 into space 99 for discharge into the well 37 may be in excess of the amount required to keep the moving parts free of contact with the catalyst at the points most subject to erosion. Any execces aeration fluid would merely serve to further strip and aerate the powdered catalyst within the well 37. The main supply of fluid for stripping and aeration, however, may be introduced to the well 37 through inlet nozzle 102.

The lower end of tubular jacket member 94 is provided with a flange member 103 having upwardly extending lug members 104 disposed on diametrically opposite sides of the tubular member 94. The tubular valve-stem 93 extends downwardly below the end of tubular jacket member 94. A fluid-tight connection is provided between the tubes 93 and 94 by means of a packed joint 105, of conventional design. The lower end of tubular member 93 is provided with one or more lateral flanged connecters 106 connectable, as by means of flexible conduits not shown, to a source of hydrocarbon oil or vapors. An additional connecter 107 is provided at the end of the hollow valve-stem 93 through which additional hydrocarbons or other fluid may be injected, or through which the hollow valve-stem 93 may be cleaned or drained.

Lug members 104 are drilled and tapped to receive pivot screws 108 upon which are mounted link members 109 disposed on opposite sides of the valve stem, as shown in Figs. 5 and 7. Link members 109 are similar to link members 63 of Figs. 2, 3 and 4 with the exception of a slight offsetting at one end because of the wider spacing at the center necessitated by the increased thickness of the valve-stem. Yoke member 66 is replaced by a wider yoke 110 pivotally connected to the members 109 by the pivot 68.

A modification of the external valve control mechanism is shown in Figs. 8 and 9. The lower end of hollow valve-stem 45, instead of terminating in a connecter 59 as shown in Fig. 2, is provided with a closure block 111 having a side connecter 112 communicating through the block with the hollow stem 45.

Spaced from the lower end of the valve-stem 45, and fixed with respect to the vessel 10, is a hydraulic cylinder 113, of conventional design, having its piston rod 114 extending upwardly in axial alignment with the valve-stem 45. An adjustable linkage, generally indicated at 115, is provided between valve-stem 45 and piston rod 114. Although any of the well-known expedients for providing a connection of adjustable length between the valve-stem and the piston rod may be used, a preferred form is illustrated in Figs. 8 and 9. A double linkage in the form of adjustable parallelograms is provided between the valve-stem 45 and the piston rod 114 comprising link members 116 mounted scissor-like on pivot pins 117 set in the sides of block 111 and similar link members 118 mounted on opposite ends of a pivot pin 119 extending through a yoke member 120 attached to the end of piston rod 114. Cross members 121, having pivot pins 122 at each end, pivotally support the scissor-like members 116 at their open ends to form adjustable parallelogram linkages on either side of members 111 and 120. A hand-operated feed screw 123, having a hand-wheel 124 at the outer end, has oppositely threaded portions 125 and 126, each of which is threaded through one of the cross members 121. Rotation of the feed screw causes the cross members 121 to move toward or away from each other, thus changing the distance between members 111 and 119. If it is desired to operate the injector valve solely by hand, the fluid under pressure is admitted to hydraulic cylinder 113 through inlet 127 so as to maintain the piston rod 114 of hydraulic cylinder 113 in its outermost position. The valve-stem 45 may then be completely hand operated by means of the hand-wheel 124. In the event of a severe downward thrust of the valve-stem by reason of expansion in the carrier line, the piston of hydraulic cylinder 113 may be urged inwardly against the normal pressure therein until the pressure in the cylinder has been increased beyond a predetermined allowable maximum, at which point relief is afforded through pressure release valve 128, thus limiting the strain on the carrier line and valve mechanism. To entirely remove the strain on the valve, the hand-crank then is backed off slightly.

It is contemplated, however, that hydraulic cylinder 113 may be connected to any conventional type of hydraulic or pneumatic control mechanism through conduits 127 and 129 at opposite ends of the cylinder. The linkage 115 may be adjusted in some intermediate fixed position and the valve-stem 45 operated by remote control entirely through the hydraulic cylinder 13.

While the injector valve has been illustrated and described particularly in connection with a fluidized powder system, it is to be understood that it is not so limited, but may readily be adapted to the transfer of non-fluidized powder by providing a suitable arrangement for continuous feed of the non-fluidized powder to the zone immediately adjacent the end of the carrier line.

It will be obvious to those skilled in the art that various other modifications may be made within the spirit of the invention, and it is desired therefore that only such limitations be placed thereon as are imposed by the appended claims.

We claim:

1. In an apparatus for separately contacting two gases with a powdered solids material, wherein two confined contacting zones arranged in superimposed relation, each zone being adapted to retain therein a bed of said powdered solids for separate contact with one of said gases, and a carrier line for transferring said solids between said beds from the lower to the upper zone comprising a substantially vertical conduit disposed within said lower zone and having an inlet at its lower end in the lower portion of said bed in the lower zone and communicating at its upper end with said bed in the upper zone, a means for controlling the flow of solids from said lower to said upper zone which includes: a substantially vertical, longitudinally moveable, hollow-stem valve entering said lower zone at the bottom thereof and having its forward end projecting into the inlet of said carrier line and having said hollow-stem in open communication with the interior of said carrier line through an orifice in said forward end; bearing means in the bottom of said lower zone around said longitudinally moveable hollow-stem valve; means for introducing a fluid into said conduit line through said hollow-stem valve and said orifice in the forward end thereof; means for introducing a sealing fluid within said bearing means; and separate external control means for longitudinally moving said valve to control the flow of said powdered solids from said lower zone to said upper zone.

2. An apparatus as described in claim 1 in which said external control means is yieldable to permit the downward movement of said valve member in response to a force in excess of a predetermined maximum in an axial direction away from the inlet of said carrier line.

3. An apparatus as described in claim 2 in which said yieldable means is comprised of a hydraulic cylinder urging said valve member into said carrier line but yieldable under a predetermined pressure.

4. In an apparatus for separately contacting two gases with a powdered solids material, wherein two confined contacting zones arranged in superimposed relation, each zone being adapted to retain therein a bed of said powdered solids for separate contact with one of said gases, and a carrier line for transferring said solids between said beds from the lower to the upper zone comprising a substantially vertical conduit disposed within said lower zone and having an inlet at its lower end in the lower portion of said bed in the lower zone and communicating at its upper end with said bed in the upper zone, a means for controlling the flow of solids from said lower to said upper zone which includes: a substantially vertical, longitudinally moveable, hollow-stem valve entering said lower zone at the bottom thereof and having its forward end projecting into the inlet of said carrier line and having said hollow-stem in open communication with the interior of said carrier line through an orifice in said forward end; bearing means in the bottom of said lower zone around said longitudinally moveable hollow-stem valve; shielding means enclosing said bearing and attached to the bottom of said lower zone and forming at its upper end a guide for said valve stem to provide a substantially powder-free space about the stem of said valve in the region of said bearing means; means for introducing a fluid into said conduit line through said hollow-stem valve and said orifice in the forward end thereof; means for introducing a sealing fluid within said shielding means; and external control means for longitudinally moving said valve to control the flow of said powdered solids from said lower zone to said upper zone.

5. In an apparatus for separately contacting two gases with a powdered solids material, one of said gases being introduced in liquid form and vaporized within the apparatus by contact with said solids, which apparatus includes two confined contacting zones arranged in superimposed relation, each zone being adapted to retain therein a bed of said powdered solids for separate contact with one of said gases, and a carrier line for transferring said solids between said beds from the lower to the upper zone comprising a substantially vertical conduit disposed within said lower zone and having an inlet at its lower end in the lower portion of said bed in the lower zone and communicating at its upper end with said bed in the upper zone, a combined means for vaporizing said liquid for contact in gaseous form with said solids in said upper zone and for controlling the flow of solids from said lower to said upper zone which includes: a substantially vertical, longitudinally moveable, hollow-stem valve entering said lower zone at the bottom thereof and having its forward end projecting into the inlet of said carrier line and having said hollow-stem in open communication with the interior of said carrier line through an orifice in said forward end; jacketing walls surrounding said hollow-stem valve and shielding the passage therethrough from temperatures within said lower zone; bearing means in the bottom of said lower zone around said longitudinally moveable hollow-stem valve; means for introducing a liquid into said conduit line through said hollow-stem valve and said orifice in the forward end thereof; means for introducing a sealing fluid within said bearing means; and external control means for longitudinally moving said valve to control the flow of said powdered solids from said lower zone to said upper zone.

6. In an apparatus for separately contacting two gases with a powdered solids material, one of said gases being introduced in liquid form and vaporized within the apparatus by contact with said solids, which apparatus includes two confined contacting zones arranged in superimposed relation, each zone being adapted to retain therein a bed of said powdered solids for separate contact with one of said gases, and a carrier line for transferring said solids between said beds from the lower to the upper zone comprising a substantially vertical conduit disposed within said lower zone and having an inlet at its lower end in the lower portion of said bed in the lower zone and communicating at its upper end with said bed in the upper zone, a combined means for vaporizing said liquid for contact in gaseous form with said solids in said upper zone and for controlling the flow of solids from said lower to said upper zone which includes: a substantially vertical, longitudinally moveable, hollow-stem valve entering said lower zone at the bottom thereof and having its forward end projecting into the inlet of said carrier line and having said hollow-stem in open communication with the interior of said carrier line through an orifice in said forward end; bearing means in the bottom of said lower zone around said longitudinally moveable hollow-stem valve; shielding means enclosing said bearing and attached to the bottom of said lower zone and to said valve and adapted to telescope with longitudinal movement thereof; means for introducing a liquid into said conduit line through said hollow-stem valve and said orifice in the forward end thereof; means for introducing a sealing fluid within said telescoping shielding means; and external control means for longitudinally moving said valve to control the flow of said powdered solids from said lower zone to said upper zone.

7. An apparatus as described in claim 1 in which the inlet of said carrier line and said moveable valve are located in a well in the bottom of said lower zone.

WILLIAM J. DEGNEN.
W. BENEDICT JOHNSON.

REFERENCES CITED

The following references are of record in the file of this patent:

UNITED STATES PATENTS

| Number | Name | Date |
|---|---|---|
| 758,118 | Sticker | Apr. 26, 1904 |
| 998,111 | Murray | July 18, 1911 |
| 1,254,244 | Leblanc | Jan. 22, 1918 |
| 1,319,193 | Von Porat | Oct. 21, 1919 |
| 1,364,532 | Von Porat | Jan. 4, 1921 |
| 1,566,517 | Bergman | Dec. 22, 1925 |
| 2,433,726 | Angell | Dec. 30, 1947 |